US009590836B2

(12) United States Patent
Sawyer

(10) Patent No.: US 9,590,836 B2
(45) Date of Patent: Mar. 7, 2017

(54) SYSTEM AND METHOD FOR DIGITAL SIDEBAND MITIGATION: ADVANCED MODULATION IN A NARROW BANDWIDTH RF CHANNEL

(71) Applicant: XETAWAVE LLC, Louisville, CO (US)

(72) Inventor: Jonathan Sawyer, Boulder, CO (US)

(73) Assignee: Xetawave LLC, Louisville, CO (US)

( * ) Notice: Subject to any disclaimer, the term of this patent is extended or adjusted under 35 U.S.C. 154(b) by 0 days.

(21) Appl. No.: 14/571,038

(22) Filed: Dec. 15, 2014

(65) Prior Publication Data

US 2015/0172090 A1  Jun. 18, 2015

Related U.S. Application Data

(60) Provisional application No. 61/915,888, filed on Dec. 13, 2013.

(51) Int. Cl.
*H04L 27/34* (2006.01)
*H04L 27/36* (2006.01)
*H04B 1/00* (2006.01)

(52) U.S. Cl.
CPC ........ *H04L 27/3411* (2013.01); *H04L 27/362* (2013.01); *H04B 1/0014* (2013.01)

(58) Field of Classification Search
CPC ........ H03M 1/00; H03M 1/12; H03M 1/0614; H03F 1/3247; H04B 1/0014; H04L 27/3411; H04L 27/362
USPC .................................................. 375/295, 298
See application file for complete search history.

(56) References Cited

U.S. PATENT DOCUMENTS

| 8,981,980 B2* | 3/2015 | Petrovic ......................... 341/144 |
| 2002/0048326 A1* | 4/2002 | Sahlman ......................... 375/297 |
| 2008/0310484 A1 | 12/2008 | Shattil |
| 2011/0261737 A1* | 10/2011 | Desai et al. .................. 370/310 |

(Continued)

FOREIGN PATENT DOCUMENTS

| WO | 2010093690 A2 | 8/2010 |
| WO | 2012139295 A1 | 10/2012 |

OTHER PUBLICATIONS

PCT International Preliminary Report on Patentability for International application No. PCT/US2014/070399, dated Jun. 14, 2016, pp. 1-8.

*Primary Examiner* — Freshteh N Aghdam
(74) *Attorney, Agent, or Firm* — Dorsey & Whitney LLP

(57) ABSTRACT

A system for transmitting modulation in a narrow band radio frequency channel include a first signal generator configured to modulate a first signal containing data for transmission to provide a primary signal, the primary signal utilizing a higher order modulation technique than would otherwise be permissible if the first signal is transmitted separately. The system further includes a second signal generator, configured to modulate a second signal containing a pulse signal to provide a second signal, wherein the peak signal level of the second signal results in a measurement of the bandwidth of the first signal at a higher signal level and a narrower bandwidth, and a digital signal processor (DSP), which receives and combines the primary signal and the secondary signal and outputs a combined modulated signal for further digital-to-analog conversion, processing and transmission in a radio frequency band.

10 Claims, 3 Drawing Sheets

(56) References Cited

U.S. PATENT DOCUMENTS

2012/0243643 A1   9/2012  Sorrells et al.
2012/0314730 A1* 12/2012  McCorkle et al. ........... 375/139
2013/0045773 A1   2/2013  Xu et al.
2015/0071641 A1*  3/2015  Wen et al. ..................... 398/98

* cited by examiner

SYSTEM AND METHOD FOR DIGITAL SIDEBAND MITIGATION: ADVANCED MODULATION IN A NARROW BANDWIDTH RF CHANNEL

CROSS-REFERENCE TO RELATED APPLICATIONS

The present application claims priority to U.S. Provisional Application No. 61/915,888, filed on Dec. 13, 2013, in the name of inventor Jonathan Sawyer and incorporates by reference, in its entirety, the disclosure set forth therein.

TECHNICAL FIELD

Embodiments discussed herein relate generally to the use of narrow bandwidth radio frequency channels.

SUMMARY OF THE INVENTION

A system for transmitting modulation in a narrow band radio frequency channel comprises a first signal generator, wherein the first signal generate modulates a first signal containing data for transmission to provide a primary signal. The system may further include a second signal generator, wherein the second signal generator modulates a second signal containing a pulse to provide a second signal; and a digital signal processor (DSP), wherein the DSP receives and combines the primary signal and the secondary signal and outputs a combined modulated signal for further digital-to-analog conversion, processing and transmission in a radio frequency band.

In at least one embodiment, a system may also include a first digital-to-analog (DAC) converter, a second DAC and an analog signal modulator and mixer, wherein the first and second DACs each receive the combined modulated signal, convert the combined modulated signal into two analog components, an impulse component and a quadrature component and output the impulse component as a first analog signal and the quadrature component as a second analog signal to the analog modulator and mixer; wherein the analog modulator and mixer is configured to combine the first analog signal and the second analog signal to produce a combined analog modulated signal providing a reference pulse signal and a modulated data signal.

In at least one embodiment, the system may also be configured such that the first data modulator generates a primary signal, the primary signal containing data modulated in accordance with a first modulation method. The first modulation method includes a higher order quadrature amplitude modulation (QAM) method, such as a 32QAM method. Further, the second data modulator can be configured to generate a second signal, such as a pulse signal, the second signal having a peak signal level greater than a peak signal level for a first signal generated by the first data modulator. In at least one embodiment, the second signal may have a peak signal level at least 75 dBm greater than the peak signal level for the first signal. The first signal may be, for example, a higher order QAM modulated signal. Further, for at least one embodiment, the primary signal and the second signal may be configured for use in a multiple address system (MAS) radio frequency band, whose necessary bandwith, for example, may be determined based upon a specified emissions designator designated by a regulator body.

In at least one embodiment, the combining of the second signal with the first signal in the DSP may result in a modified waveform wherein the emissions designator associated with the modified waveform permits the use of higher order modulation techniques. Further, in at least one embodiment, the first signal may be a QAM modulated signal having an order equal to or greater than 16QAM and the second signal may be at least one of a pulse signal or a QAM modulated signal having an order of equal to or less than 8QAM and the order of QAM modulation used for the first signal and a necessary bandwidth required may dictate the form and peak signal level of the second signal. In at least one embodiment, the peak signal level of the second signal may be at least 75 dBM higher than a measured specific signal level offset required for a primary signal transmitted separately.

BRIEF DESCRIPTION OF THE DRAWING FIGURES

Many aspects of the present disclosure may be better understood with reference to the following drawings. The components in the drawings are not necessarily depicted to scale, as emphasis is instead placed upon clear illustration of the principles of the disclosure. Moreover, in the drawings, like reference numerals designate corresponding parts throughout the several views. Also, while several embodiments are described in connection with these drawings, the disclosure is not limited to the embodiments disclosed herein. On the contrary, the intent is to cover all alternatives, modifications, and equivalents.

DETAILED DESCRIPTION

Figure 1:
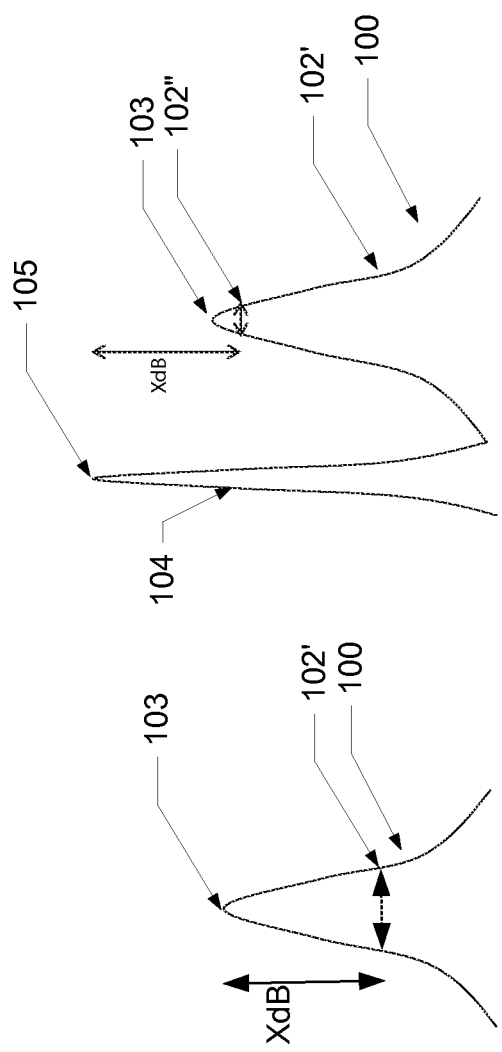
FIGS. 1A and 1B depict a method for modulating a radio frequency signal in a narrow band channel in accordance with at least one embodiment disclosed herein.

The various system and method embodiments disclosed herein are directed to using various modulation methods, such as Quadrature Amplitude Modulation ("QAM") in a narrow bandwidth radio frequency channel while also satisfying various regulations and requirements, such as those of the United States Federal Communications Commission ("FCC").

In accordance with at least one embodiment, the FCC's Part 2.202(b) regulation generally requires the use of a computed "necessary bandwidth" ("Bn") that is "sufficient to ensure the transmission of information at the rate and with the quality required for the systems employed, under specified conditions." For example, the emissions of a composite transmission using digital sideband modulation with amplitude modulation, as may arise, for example, in use with a microwave radio relay systems is designated, pursuant to Part 2.202(b), table g section III-A 6 "Composite Emissions" of such regulations, with the "5M00K7" emissions designation. Further, the regulations provide that the Bn for such an emission is defined by the formula:

$$Bn = 2RK/\log 2S$$

where:
"R" is the bit rate/throughput
"K" is a numerical factor which varies according to the emission and depends upon the allowable signal distortion; and
"S" is the number of signaling states available.

For example, if a 32QAM modulated signal is used in conjunction with a 5M00K7 designated emission, with 5 signaling states and a throughput of 51 kbps or 10.2 k symbols per second, with a numerical factor K of 1, the Bn becomes:

$$Bn=2*51000*1/\log 2(32)=20.4 \text{ kHz}$$

That is, pursuant to the FCC's regulation, the necessary bandwidth required for such a 32QAM signal is 20.4 kHz. However, a 32QAM modulated signal, as per the various embodiments disclosed herein, can be shown to fit within a 12.5 kHz bandwidth, when measured using a spectrum analyzer. That is, the FCC's computed necessary bandwidth results in an artificially large value of 'necessary bandwidth' that is not supported by data.

Thus, in order to facilitate the use of higher order modulation techniques, such as 32QAM while also satisfying regulations and requirements, such as the above mentioned FCC's regulations, the various embodiments disclosed herein provide a new approach whereby a single modulation method is combined with a second modulation method in order to modify the resulting combined waveform such that the measured bandwidth occurs at a higher threshold signal level and thereby permits the use of higher order modulation techniques. In one embodiment, the secondary modulation method includes a pulse modulated signal. The resulting modulation being a composite emission. Using such a composite emission, the bandwidth can be measured and utilized to classify a given radio.

For example, a bandwidth designation such as 20k4D1W can be replaced by a measured bandwidth using a designation such as 11k7W1W. This change in designation results in a change in the formula used to calculate any necessary bandwidth and results in the computed necessary bandwidth of 20.4 kHz being replaced by the measured 99% bandwidth of 11.7 kHz. Embodiments utilizing this inventive multiple modulation method are identified herein as Digital Sideband Mitigation ("DSM") methods.

By applying multiple modulation methods, the various embodiments disclosed herein permit design changes in a radio, which when implemented invoke a different set of FCC rules and regulations and allow a radio certified, for example, in a Multiple Address System ("MAS") band to use higher orders of modulation than would otherwise be permitted if only a single modulation method is utilized.

For example, using a conventional single modulation method, the maximum data throughput of a radio is limited by the sidebands transmitted. Accordingly, conventional approaches commonly result in the use of simpler modulation methods having lower data throughput. In contrast, the DSM method and system, as per the various embodiments disclosed herein, permits a given radio, such as a Xeta9 radio made by Xetawave, to increase its throughput.

More specifically, and in accordance with at least one embodiment disclosed herein and as shown, for example, in FIGS. 1A-1B, a primary waveform 100 is commonly measured at a specific signal level XdB below the peak 103 of the signal energy. For example, the XdB signal level might be measured at a bandwidth at −70 dBM of the peak 103 signal level, as shown at signal level 102'. When a secondary modulated signal 104, such as a pulse signal, with a much higher peak signal level 105 is modulated with the primary signal into a composite DSM signal, the bandwidth of the primary signal 100 may be measured at a new signal level, XdB of the combined peak signal level 105, as shown in FIG. 1B. As shown, the calculated bandwidth of the primary signal 100 is effectively narrower as the point in the primary signal spectrum 102" at which the XdB bandwidth is now measured is higher and narrower than would otherwise be measured if only a single modulation was applied and the bandwidth had been measured at the single modulated signal location 102'. Accordingly, it is to be appreciated that for a given target bandwidth, the height of the peak signal level 105 of the second modulated signal may be set such that the primary bandwidth measurement point, as specified at a reference point a given amount below a peak signal energy, is higher and narrower. Again, in at least one embodiment, the second modulated signal is a pulse signal.

It is to be appreciated that the above described method of modifying a single modulation signal modified waveform into a DSM in order to conform to specific FCC regulations can be applied to other modulation methods with a corresponding change in the Emissions Designator change. For example, by using this method with an exemplary Xeta9 radio, compliance can be achieved for FCC certification in a narrow band channel that would not otherwise be possible using conventional modulation techniques. In Table 1 below, three examples of modulation methods are shown with the Bn computation and the measured 99% bandwidth with the corresponding FCC Emissions Designator. Items 1-3 provide the Bn required if only a single modulation method is utilized. Items 4-6, provide the Bn required if DSM method, as per one or more embodiments disclosed herein, is utilized. It is to be appreciated that the DSM permits the certification of an exact same modulation technique (e.g., 8QAM) for a 12.5 kHz bandwidth channel that, using single modulation techniques, would have required greater than a 20.4 kHz bandwidth channel.

TABLE 1

| Item # | Modulation Type | Necessary BW (kHz) | 99% BW (kHz) | Emissions Designator FCC | Emissions Designator FCC |
|---|---|---|---|---|---|
| 1 | 8QAM | 20.4 | | 20k4D1W | |
| 2 | 16QAM | 20.4 | | 20k4D1W | |
| 3 | 32QAM | 20.4 | | 20k4D1W | |
| 4 | 8QAM | | 11.9 | | 11k9W1W |
| 5 | 16QAM | | 11.9 | | 11k9W1W |
| 6 | 32QAM | | 11.7 | | 11k7W1W |

While Table 1 identifies the bandwidth reductions possible using the various DSM embodiments disclosed herein in conjunction with QAM type signals, it is to be appreciated that the DSM methodology can be applied to any other modulation method where the computed necessary bandwidth is larger than is otherwise operationally desired. Examples of such other modulation methods include frequency shift keying ("FSK"), phase shift keying ("PSK") and other variants which may include modifications to the shape and number of levels of modulation applied. Thus, it is to be appreciated that in accordance with embodiments of the present invention, the addition of a second modulation method, for example, a pulse signal, to an existing modulation method, a smaller measured bandwidth instead of a larger computed necessary bandwidth may be utilized while maintaining compliance with FCC and/or other governing bodies rules and regulations. The embodiments disclosed herein, thus allow more efficient utilization of available bandwidths within permitted operations.

Figure 2:
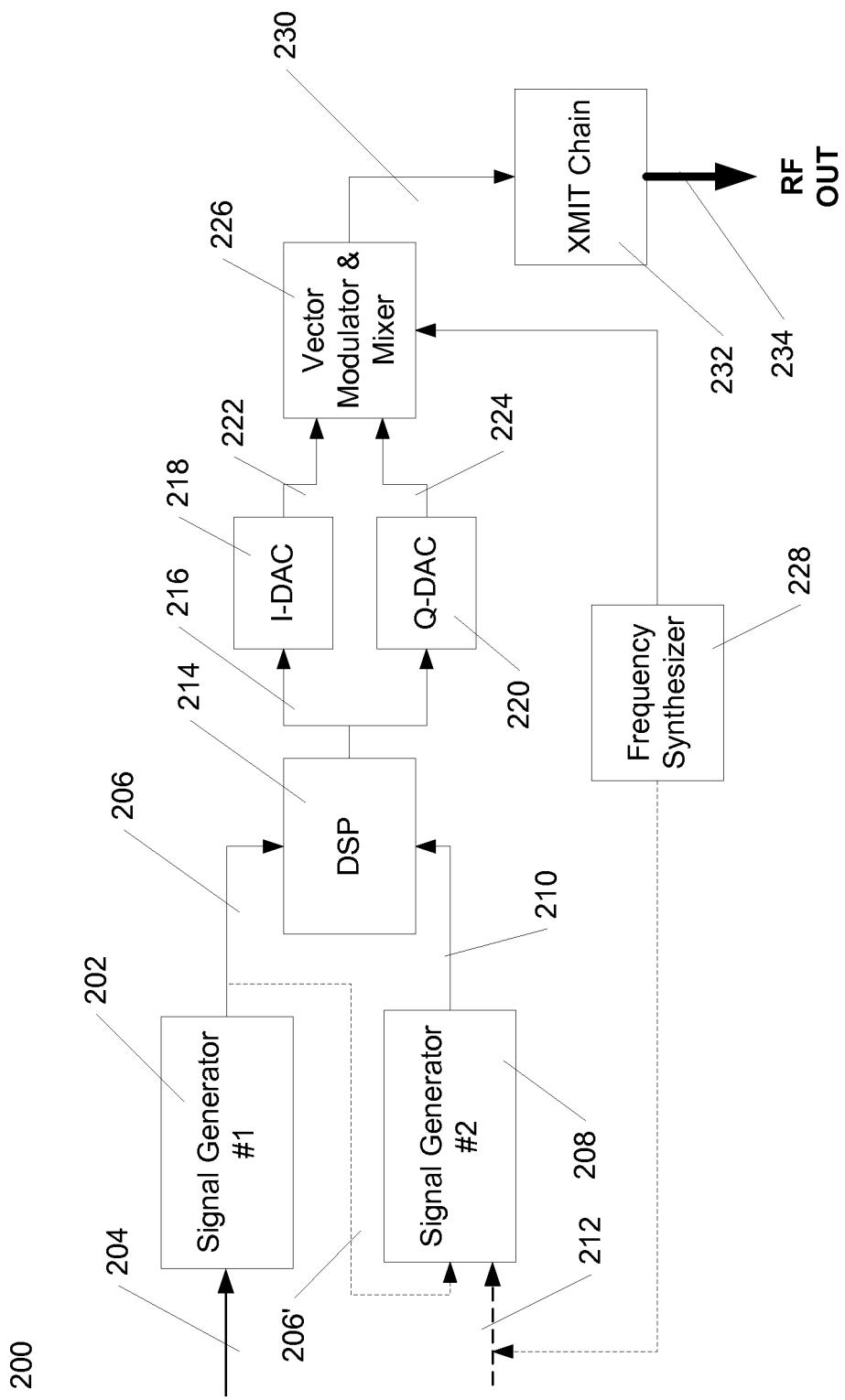
FIG. 2 depicts a transmitter configured for transmitting a radio frequency signal in accordance with the method of modulating depicted in FIG. 1 and at least one embodiment disclosed herein.

As shown in FIG. 2, an embodiment of a transmitter 200 for forming a DSM signal includes a first signal generator 202. The first signal generator 202 desirably receives a first incoming data signal 204, converts the first incoming data signal according into a predetermined or then determined signal format, and outputs a primary signal 206 per the desired format.

The embodiment also includes a second signal generator 208. In at least one embodiment, the second signal generator 208 may be configured to receive a sampling 206' of the primary signal 206 and determine the peak signal level of the primary signal 206. The peak signal level of the primary signal 206, hereafter the "primary peak signal level", may be determined in any manner desired, such as, as detected at an instant in time, as detected over a given period of time, based on an average, calculated, or other statistical determination or otherwise. Further, the primary peak signal level may be determined based on a preset value, one or more samplings and/or over a given period or otherwise. Based on the primary peak signal level, regardless of how determined, the second signal generator 208 generates and outputs a second signal 210. The first signal 206 and the second signal 210 may be of any desired forms, may utilize any desired modulation technique or otherwise. The second signal, however, desirably has a higher peak signal level than the first signal. For example, in at least one embodiment, the second signal 210 may be a pulse signal while the first signal is of a longer bandwidth and at a lower peak signal level. In another embodiment, the first signal and/or the second signal may each be QAM modulated signals or other formatted signal types. Regardless of the formats of the first signal 206 and the second signal 210, the second signal 210 desirably has a second peak signal level that is a desired number of decibels greater than the primary peak signal level. For example, in at least one embodiment the second peak signal level may be set at an "offset" level which is +70 dBm higher than the primary peak signal level. However, other offset levels may be used in other embodiments.

In another embodiment, the second signal generator 208 may be configured to receive a second incoming data signal 212 that is provided to the second signal generator 208 separate from the incoming data signal 204 and is provided independent of the first signal 206. That is, in at least this embodiment, the second signal generator 208 generates the second signal 210 independent of the first signal 206. As per the other embodiments, the second signal 210 is defined by having a second peak signal level that is a desired number of decibels greater than the primary peak signal level, as determined at an instance in time, over a range of time or otherwise. It is to be appreciated, that the second peak signal level may vary over time and such variance may be in accordance with any variations, if any, in the primary peak signal level, a desired level of bandwidth of a given time, over a given time period, or otherwise. It is also to be appreciated that the amount of the XdB offset provided between the primary peak signal level and the second peak signal level may vary over time, based on the particular implementation contemplated or otherwise. As the XdB offset varies, the measured bandwidth of the primary signal 206 may likewise vary.

Further, the second incoming data signal 212, in at least one embodiment, may be provided by a frequency synthesizer 228. The frequency synthesizer 228 may be configured to vary the input to the second signal generator 208 based upon the modulation technique utilized in the radio, as specified by, for example, the chosen vector modulator and mixer 226 or otherwise.

As shown in FIG. 2, the primary signal 206 and the secondary signal 210 are each output to a Digital Signal Processor ("DSP") 214 or similar component. In at least one embodiment, the DSP 214 controls the waveform by sending a combined modulated signal 216 to a first digital-to-analog converter (DAC) 218 and to a second DAC 220. In at least one embodiment, the first DAC 218 is an in-phase digital-to-analog converter (an "I-DAC") and the second DAC 220 is a quadrature DAC (a "Q-DAC"). Other forms and/or numbers of DACs may be utilized in other embodiments.

As shown with respect to the embodiment of FIG. 2, the first DAC outputs a first analog signal 222 and the second DAC 220 outputs a second analog signal 224 to analog modulator and mixer 226. In at least one embodiment, the analog modulator and mixer includes a vector modulator which utilizes quadrature amplitude modulation.

It is to be appreciated, however, that other data conversion formats may be utilized by the DSP 214 and the analog modulator and mixer 226, including but not limited to, FSK, PSK and other modulation techniques. The analog modulator and mixer outputs an analog modulated signal 230 which is provided to a conventional transmit chain 232, such chain may include one or more amplifiers, filters, antenna and other commonly known radio frequency transmission components. The output of the XMIT chain 232 is a composite RF signal containing both waveforms and facilitates the providing of higher order modulated signals while staying within narrower bandwidth channel limitations, such as those provided for use in the MAS band.

It is to be appreciated that the DSM implementation, as described above, for example with reference to the transmitter of FIG. 2, modifies the standard single data input into the DSP so as to have at least two inputs, one for each waveform type. Other numbers of waveforms may be input into the DSP as particular embodiments may desire. The DSP thus will generate two different modulation methods based on the input streams. For example, one input could be connected to a pulse generator and the second input to a data modulator such as QAM (quadrature amplitude modulation). Or both inputs could be connected to similar modulators such as 8QAM and 32QAM. One embodiment is to have the primary waveform generate a pulse with a specified height (amplitude) and width and the secondary waveform generate a data stream of quadrature amplitude modulation with 32 levels (32QAM).

Regardless of the modulation scheme utilized with any given implementation of the various embodiments disclosed herein, it is to be appreciated that by providing at least two input streams, and modulating and mixing each of such input streams into a combined, single RF output stream, the various embodiments disclosed herein solve the problem in narrow channel radios, such as the MAS bands, of a single data modulator and modulation method having to be used in order to comply with FCC regulations requiring no out-of-band transmissions. As discussed above, such existing approaches result in lower data throughput and often wasted, unused spectrum. In accordance with the embodiments disclosed herein, the present DSM implementation maintains compliance with the FCC regulations of not transmitting any out-of-band transmissions while also permitting multiple and higher level modulation methods and thus, greater data throughput and less spectrum being not used.

Figure 3:
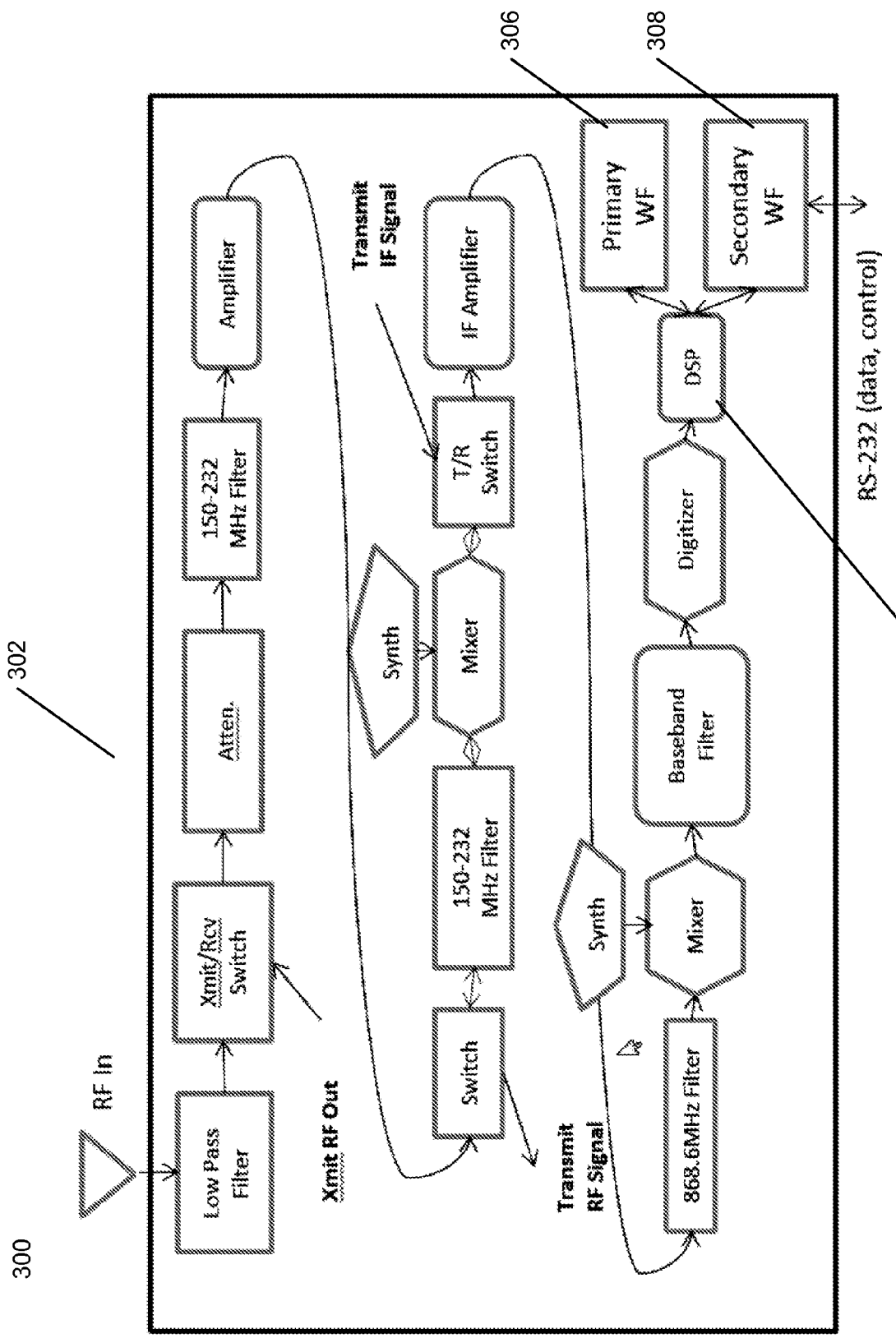
FIG. 3 depicts a receiver configured for receiving and processing a radio frequency signal modulated in accordance with the method of modulating depicted in FIG. 1 and at least one embodiment disclosed herein.

As shown in FIG. 3, an embodiment for a receiver 300 configured to receive a DSM signal includes common radio frequency receiver components 302, including an antenna, low pass filter, attenuator, one or more filters including band-pass filters, one or more amplifiers, frequency synthesizer, mixer, switches, and digitizers. FIG. 3 depicts one embodiment of such common receiver components, it is to be appreciated, however, that one or more of such components may be excluded from or included any given embodiment of a receiver. Other common components not shown may also be included in any given receiver in accordance with an embodiment disclosed herein.

In addition to such common receiver components, receiver 300 also includes a DSP 304 which includes additional demodulation circuitry for separating and processing the two or more waveforms (e.g., the first signal and the second signal) transmitted. In at least one embodiment, the DSP 304 includes a first path 306, containing for example a QAM de-modulator when the first signal has been QAM modulated, and a second path, containing for example a pulse detector for use with the second signal. The first signal and the second signal may be decoded separately by the DSP, as represented illustratively in FIG. 3 by the primary WF path 306 and the secondary WF path 308. It is to be appreciated, however, that in other embodiments, the DSP may process both signals together. Further, as discussed above, the first signal and second signals may be modulated into any desired waveform by the transmitter. Accordingly, the receiver may be configured to receive and process any such waveforms in accordance with the various embodiments discussed herein. It is also to be appreciated that the transmitter and receiver may be combined into a single transponder, as desired for any particular embodiment wherein both transmit and receive capabilities for DSM modified waveforms is desired. Upon demodulating the first signal and the second signals, the receiver outputs the data associated with the first signal to additional processing equipment, as per the needs of any given embodiment. Further, in at least one embodiment, the second signal may also be utilized to provide data to other processing equipment, with it being appreciated that the type and quantity of data provided by the first and/or second signals depends on the needs of the embodiment, the available bandwidth and the waveform types utilized.

Although this document lists several concepts, methods, systems and apparatuses for digital sideband mitigation, it should be appreciated by those of ordinary skill in the art that the contents of this document may be readily adapted to various other embodiments without requiring any inventive step. Accordingly, the concepts, methods, systems, apparatuses and the like discussed herein are provided by way of illustration and not limitation and the proper scope of the present invention is delimited only by the following claims and their equivalents.

I claim:

1. A system for transmitting modulation in a narrow band radio frequency channel comprising:
    a first signal generator, wherein the first signal generator modulates a first signal containing data for transmission to provide a primary signal;
    a second signal generator, wherein the second signal generator modulates a second signal containing a pulse to provide a secondary signal, the secondary signal having a peak signal level greater than a peak signal level for the primary signal generated by the first signal generator; and
    a digital signal processor (DSP), wherein the DSP receives and combines the primary signal and the secondary signal and outputs a combined modulated signal for further digital-to-analog conversion, processing and transmission in the narrow band radio frequency channel.

2. The system of claim 1, wherein the second signal is a pulse signal.

3. The system of claim 2, wherein the secondary signal has a peak signal level at least 76 dBm greater than the peak signal level for the primary signal.

4. The system of claim 2, wherein the primary signal is a higher order QAM modulated signal.

5. The system of claim 4, wherein the primary signal and the secondary signal are configured for use in a multiple address system (MAS) radio frequency band.

6. The system of claim 4, wherein the necessary bandwidth of the MAS band is determined based upon a specified emissions designator.

7. A system for transmitting modulation in a narrow band radio frequency channel comprising:
    a first signal generator, wherein the first signal generator modulates a first signal containing data for transmission to provide a primary signal;
    a second signal generator, wherein the second signal generator modulates a second signal containing a pulse to provide a secondary signal; and
    a digital signal processor (DSP), wherein the DSP receives and combines the primary signal and the secondary signal and outputs a combined modulated signal for further digital-to-analog conversion, processing and transmission in the narrow band radio frequency channel and the combining of the secondary signal with the primary signal in the DSP results in a modified waveform wherein an emissions designator associated with the modified waveform permits use of at least one higher order modulation technique.

8. The system of claim 7, wherein the primary signal is a QAM modulated signal having an order equal to or greater than 16 QAM and the secondary signal is at least one of a pulse signal or a QAM modulated signal having an order of equal to or less than 8 QAM.

9. The system of claim 8, wherein the order of QAM modulation used for the primary signal and a necessary bandwidth required dictates the form and peak signal level of the secondary signal.

10. The system of claim 9, wherein the peak signal level of the secondary signal is at least 75 dBM higher than a measured specific signal level offset required for the primary signal transmitted separately.

* * * * *